(12) United States Patent
Ding et al.

(10) Patent No.: US 11,772,556 B2
(45) Date of Patent: Oct. 3, 2023

(54) DISPLAY CONTROL SYSTEM AND DISPLAY CONTROL METHOD

(71) Applicant: KOMATSU LTD., Tokyo (JP)

(72) Inventors: Qi Ding, Tokyo (JP); Yasuhiro Ibusuki, Tokyo (JP); Jun Morinaga, Tokyo (JP); Masanori Minagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 17/264,518

(22) PCT Filed: Oct. 31, 2019

(86) PCT No.: PCT/JP2019/042846
§ 371 (c)(1),
(2) Date: Jan. 29, 2021

(87) PCT Pub. No.: WO2020/090985
PCT Pub. Date: May 7, 2020

(65) Prior Publication Data
US 2021/0291733 A1 Sep. 23, 2021

(30) Foreign Application Priority Data
Oct. 31, 2018 (JP) .................. 2018-205905

(51) Int. Cl.
*H04N 7/18* (2006.01)
*B60R 1/00* (2022.01)
(Continued)

(52) U.S. Cl.
CPC ................ *B60R 1/00* (2013.01); *E02F 9/261* (2013.01); *H04N 5/272* (2013.01); *H04N 7/18* (2013.01); *E02F 3/308* (2013.01); *E02F 9/264* (2013.01)

(58) Field of Classification Search
CPC .... B60R 1/00; H04N 7/18; H04N 5/00; E02F 9/00; E02F 3/00
See application file for complete search history.

(56) References Cited

U.S. PATENT DOCUMENTS

2013/0169690 A1 7/2013 Gotou et al.
2014/0354813 A1* 12/2014 Ishimoto ................... B60R 1/00
348/148
(Continued)

FOREIGN PATENT DOCUMENTS

JP 2001-348914 A 12/2001
JP 2010-53609 A 3/2010
(Continued)

OTHER PUBLICATIONS

The International Search Report for the corresponding international application No. PCT/JP2019/042846, dated Jan. 21, 2020.

*Primary Examiner* — Maryam A Nasri
(74) *Attorney, Agent, or Firm* — Global IP Counselors, LLP

(57) ABSTRACT

A work vehicle includes work equipment having a work tool and a support member supporting the work tool. A display control system controls a display device provided outside the work vehicle. The display control system includes a captured image acquisition unit, a supplementary image acquisition unit, a display image generation unit, and a display control unit. The captured image acquisition unit acquires a captured image captured by an imaging device mounted on the work vehicle. The supplementary image acquisition unit acquires a supplementary image representing information related to the work vehicle. The display image generation unit generates a display image in which the supplementary image is disposed in an area where a side surface of the support member can be shown in the captured
(Continued)

image. The display control unit outputs a display signal in order to display the display image on the display device.

8 Claims, 9 Drawing Sheets

(51) Int. Cl.
    *E02F 9/26*           (2006.01)
    *H04N 5/272*        (2006.01)
    *E02F 3/30*           (2006.01)

(56) References Cited

U.S. PATENT DOCUMENTS

| | | | |
|---|---|---|---|
| 2017/0072850 A1* | 3/2017 | Curtis | G08G 1/168 |
| 2017/0248946 A1* | 8/2017 | Ogura | H04Q 9/00 |
| 2017/0308074 A1 | 10/2017 | Kandula et al. | |
| 2017/0322624 A1 | 11/2017 | Niccolini et al. | |
| 2018/0051446 A1 | 2/2018 | Yoshinada et al. | |
| 2018/0080199 A1* | 3/2018 | Deguchi | E02F 9/26 |
| 2020/0018046 A1 | 1/2020 | Izumikawa | |

FOREIGN PATENT DOCUMENTS

| | | |
|---|---|---|
| JP | 2011-9823 A | 1/2011 |
| JP | 2012-62707 A | 3/2012 |
| JP | 2013-168778 A | 8/2013 |
| JP | 2013168778 A * | 8/2013 |
| JP | 2016-89388 A | 5/2016 |
| JP | 2017022433 A | 1/2017 |
| WO | 2017/069683 A1 | 10/2016 |
| WO | 2018181534 A1 | 10/2018 |

* cited by examiner

DISPLAY CONTROL SYSTEM AND DISPLAY CONTROL METHOD

CROSS-REFERENCE TO RELATED APPLICATIONS

This application is a U.S. National stage application of International Application No. PCT/JP2019/042846, filed on Oct. 31, 2019. This U.S. National stage application claims priority under 35 U.S.C. § 119(a) to Japanese Patent Application No. 2018-205905, filed in Japan on Oct. 31, 2018, the entire contents of which are hereby incorporated herein by reference.

BACKGROUND

Filed of the Invention

The present invention relates to a display control system and a display control method for controlling a display device in a remote operation room for remotely operating a work vehicle.

Background Information

The technology for remotely operating a work vehicle is known. In order to remotely operate the work vehicle, it is necessary to be able to recognize the surrounding situation of the work vehicle from the outside. Accordingly, the remotely operated work vehicle is provided with an imaging device for imaging the surrounding situation and a communication apparatus for transmitting the captured image to the outside. As a result, the operator can perform the operation while visually recognizing the image transmitted from the work vehicle (see, for example, Japanese Unexamined Patent Application, First Publication, No. 2013-168778).

SUMMARY

An operator recognizes the situation of the work vehicle by visually recognizing the image, and operates the work vehicle based on the situation. However, in the case of remote operation, the operator cannot obtain the sensation that can be obtained when actually riding in the work vehicle, such as the inclination of the work vehicle. Accordingly, when the operator is riding in the work vehicle, the operator can guess the state of the work vehicle from the sensation to perform the work, but in the case of remote operation, it is difficult for the operator to guess the state of the work vehicle.

An object of an aspect of the present invention is to provide a display control system and a display control method capable of supplementing a lack of sensation that an operator cannot obtain because of remote operation.

According to a first aspect of the present invention, there is provided a display control system that is a display control device for controlling a display device provided outside a work vehicle, the display control system including a captured image acquisition unit that acquires a captured image captured by an imaging device mounted on the work vehicle, a supplementary image acquisition unit that acquires a supplementary image that is an image representing information related to the work vehicle, a display image generation unit that generates a display image in which the supplementary image is disposed in an area where a portion of the work vehicle can be shown in the captured image, and a display control unit that outputs a display signal for displaying the display image on the display device.

According to the above aspect, the display control system can supplement the sensation that an operator cannot obtain because of remote operation.

DETAILED DESCRIPTION OF EMBODIMENT(S)

First Embodiment (Remote Operation System)

Figure 1:
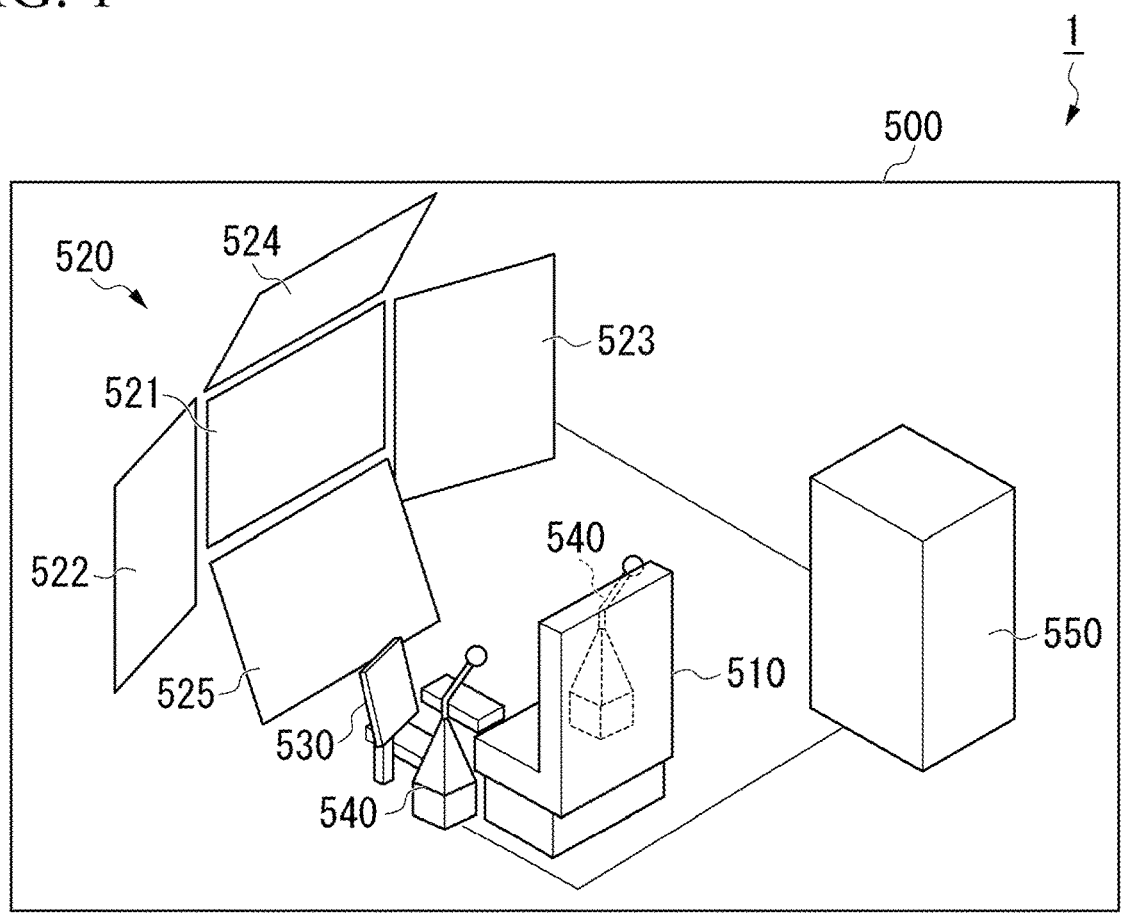
FIG. 1 is a schematic diagram showing a configuration of a remote operation system according to a first embodiment.
Figure 1:
Figure 1:
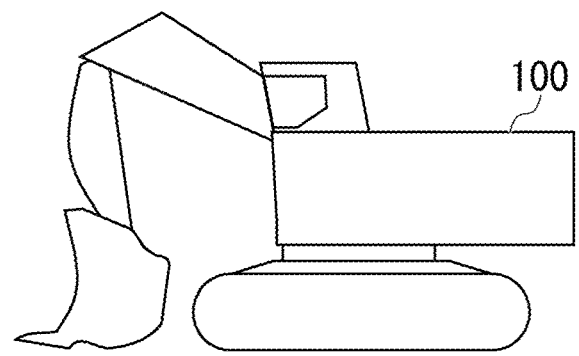

FIG. 1 is a schematic diagram showing a configuration of a remote operation system according to a first embodiment.

A remote operation system 1 includes a work vehicle 100 operated by remote operation and a remote operation room 500 to perform remote operation. The work vehicle 100 operates at a work site (for example, a mine and a quarry). The remote operation room 500 is provided at a point separated from the work vehicle 100 (for example, a city and an inside of the work site). The work vehicle 100 and the remote operation room 500 are connected via a communication means as the Internet.

The remote operation system 1 is a system to operate the work vehicle 100 by using the remote operation room 500.

The work vehicle 100 operates according to an operation signal received from the remote operation room 500.

The remote operation room 500 receives the operation of the work vehicle 100 by the operation of the operator and transmits the operation signal to the work vehicle 100.

(Work Vehicle)

Figure 2:
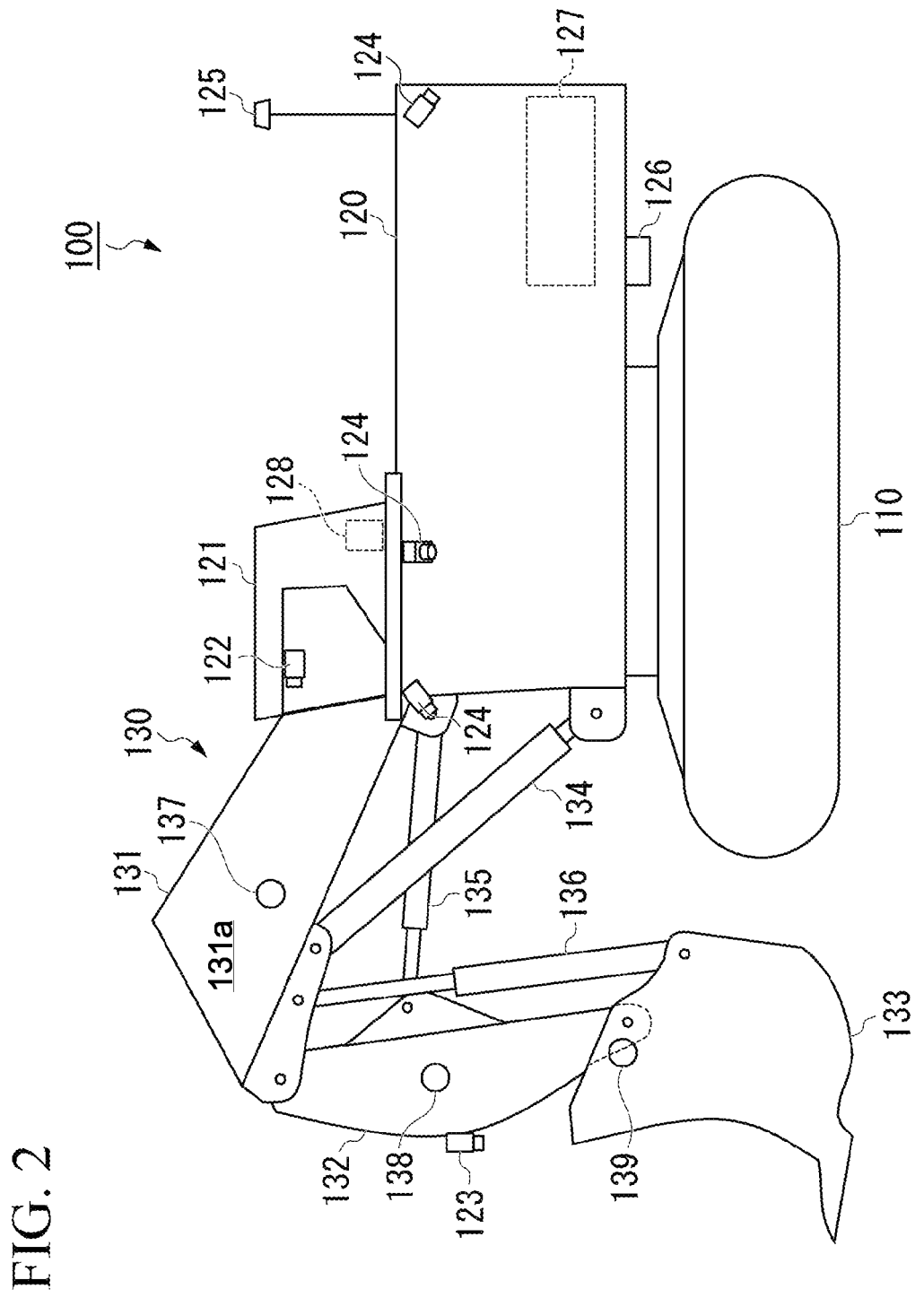
FIG. 2 is an external diagram of a work vehicle according to the first embodiment.

FIG. 2 is an external diagram of the work vehicle according to the first embodiment.

The work vehicle 100 according to the first embodiment is a hydraulic excavator. The work vehicle 100 according to another embodiment may be a work vehicle other than the hydraulic excavator, such as a wheel loader or a bulldozer.

The work vehicle 100 includes work equipment 130 driven by hydraulic pressure, a swing body 120 that supports the work equipment 130, and an undercarriage 110 that supports the swing body 120.

The work equipment 130 includes a boom 131, an arm 132, and a bucket 133. The work equipment 130 is driven as a boom cylinder 134, an arm cylinder 135, and a bucket cylinder 136 expand and contract. A boom angle sensor 137, an arm angle sensor 138, and a bucket angle sensor 139 are mounted on the boom 131, the arm 132, and the bucket 133, respectively.

A base end portion of the boom 131 is attached to the swing body 120 via a pin.

The arm 132 connects the boom 131 to the bucket 133. A base end portion of the arm 132 is attached to a tip portion of the boom 131 via a pin. The boom 131 and the arm 132 are examples of support members that support the bucket 133.

The bucket 133 includes teeth for excavating earth or the like and a container for containing the excavated earth. A base end portion of the bucket 133 is attached to a tip portion of the arm 132 via a pin. The bucket 133 is an example of a work tool. In another embodiment, an attachment other than the bucket 133 may be used as the work tool.

The boom cylinder 134 is a hydraulic cylinder for operating the boom 131. A base end portion of the boom cylinder 134 is attached to the swing body 120. A tip portion of the boom cylinder 134 is attached to the boom 131.

The arm cylinder 135 is, for example, a hydraulic cylinder for driving the arm 132. A base end portion of the arm cylinder 135 is attached to the boom 131. A tip portion of the arm cylinder 135 is attached to the arm 132.

The bucket cylinder 136 is, for example, a hydraulic cylinder for driving the bucket 133. A base end portion of the bucket cylinder 136 is attached to the boom 131. A tip portion of the bucket cylinder 136 is attached to the bucket 133.

The boom angle sensor 137 is attached to the boom 131 and measures an inclination angle of the boom 131.

The arm angle sensor 138 is attached to the arm 132 and measures an inclination angle of the arm 132.

The bucket angle sensor 139 is attached to the bucket 133 and measures an inclination angle of the bucket 133.

The boom angle sensor 137, the arm angle sensor 138, and the bucket angle sensor 139 according to the first embodiment measure an inclination angle with respect to a horizontal plane. An angle sensor according to another embodiment is not limited thereto, and may measure an inclination angle with respect to another reference plane. For example, in another embodiment, an angle sensor may measure a relative rotation angle by a potentiometer provided at base end portions of the boom 131, the arm 132, and the bucket 133, or may measure an inclination angle by measuring cylinder lengths of the boom cylinder 134, the arm cylinder 135, and the bucket cylinder 136 and converting the cylinder lengths into an angle.

The swing body 120 includes a cab 121. The cab 121 is provided on the left side of the work equipment 130. The cab 121 is provided with a front camera 122. The front camera 122 is installed at a front upper portion in the cab 121. The front camera 122 images the front of the cab 121 through a windshield at a front portion of the cab 121. Herein, the "front" refers to a direction in which the work equipment 130 is mounted on the swing body 120, and the "rear" refers to a direction opposite to the "front". The "lateral" refers to a direction (right-and-left direction) intersecting the front-and-rear direction. An example of the front camera 122 includes an imaging device using a charge coupled device (CCD) sensor and a complementary metal oxide semiconductor (CMOS) sensor. The work vehicle 100 according to another embodiment may not include the cab 121 when driven by remote operation or unmanned operation. In this case, the front camera 122 is installed to face forward at the front of the swing body 120.

Figure 3:
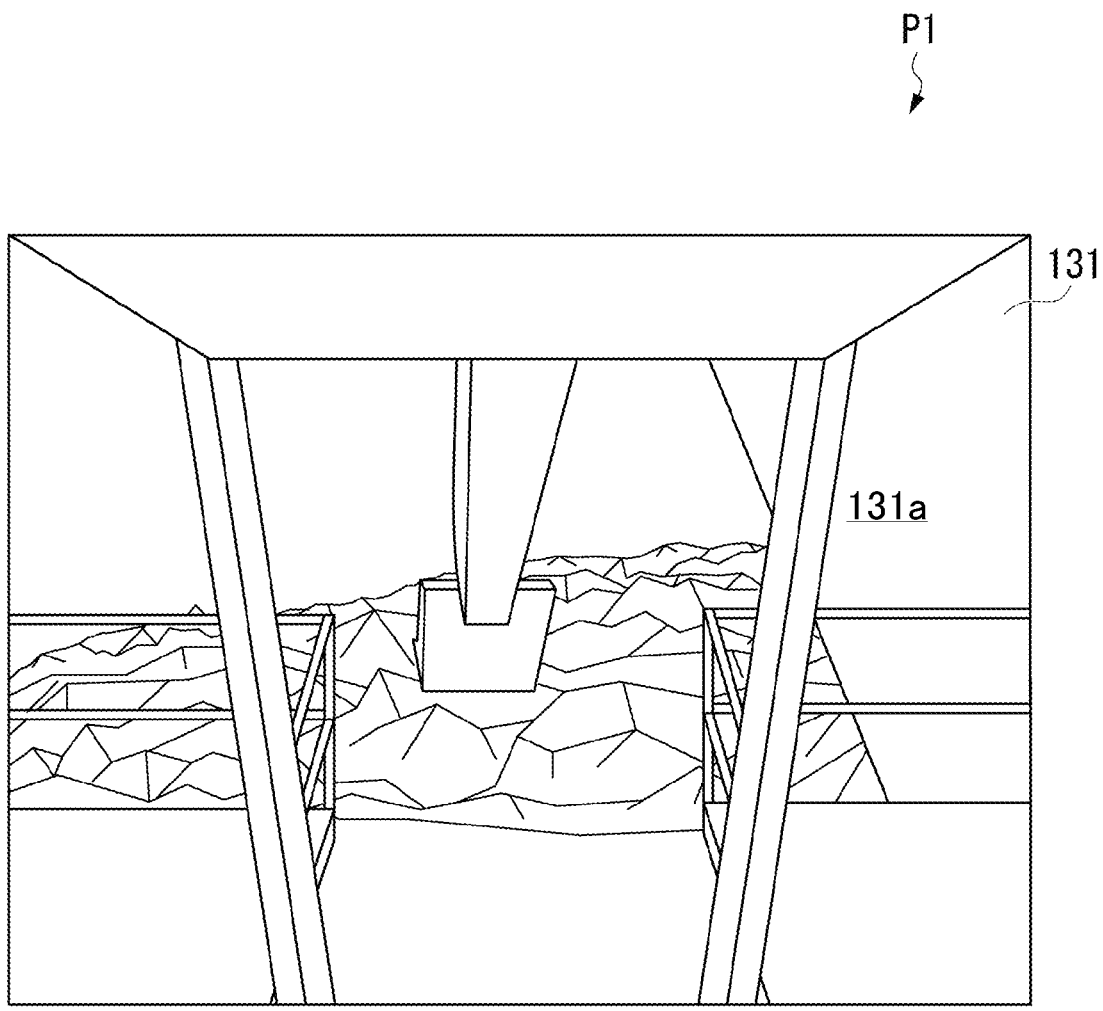
FIG. 3 is an example of an image captured by an imaging device of the work vehicle according to the first embodiment.

FIG. 3 is an example of an image captured by the imaging device of the work vehicle according to the first embodiment. The front camera 122 images a scope in which a work target in front of the work equipment 130 and the cab 121 is shown. That is, as shown in FIG. 3, an image P1 captured by the front camera 122 shows that the work target in front of the work equipment 130 and the cab 121 is shown. Further, since the cab 121 is provided on the left side of the work equipment 130, a portion of the boom 131 is shown in the right side portion of the image P1. The work equipment 130 of the work vehicle 100 according to another embodiment may be mounted on the right side of the cab 121. In this case, a portion of the boom 131 is shown in the left side portion of the image P1. The work equipment 130 is shown in the image P1 during, for example, excavation work.

The work vehicle 100 includes the front camera 122, a bucket camera 123, a plurality of peripheral monitoring cameras 124, a position and azimuth direction calculator 125, an inclination measurer 126, a hydraulic device 127, and a control device 128.

The bucket camera 123 is provided on the front surface of the arm 132 and images the inside of the bucket 133.

Each of the plurality of peripheral monitoring cameras 124 is provided on the peripheral surface of the swing body 120 and images the vicinity of the work vehicle 100. The peripheral monitoring cameras 124 are disposed to overlap the imaging scopes of the adjacent peripheral monitoring cameras 124 with each other. As a result, the entire circumference of the work vehicle 100 can be captured at the same time. The peripheral monitoring cameras 124 are provided, for example, at the front, the left front, the right front, the left rear, the right rear, and the rear of the swing body 120, and the lower portion of the counterweight.

The position and azimuth direction calculator 125 calculates a position of the swing body 120 and an azimuth direction in which the swing body 120 faces. The position and azimuth direction calculator 125 includes two receivers that receive positioning signals from artificial satellites constituting GNSS. The two receivers are installed at positions different from each other on the swing body 120. The position and azimuth direction calculator 125 measures a position of a representative point of the swing body 120 in a site coordinate system (the origin of an excavator coordinate system) based on the positioning signal received by the receiver.

The position and azimuth direction calculator 125 uses respective positioning signals received by the two receivers to calculate an azimuth direction in which the swing body 120 faces as a relationship between an installation position of one receiver and an installation position of the other receiver.

In another embodiment, the position and azimuth direction calculator 125 may measure an azimuth direction in which the swing body 120 faces based on a measurement value of a rotary encoder or an IMU. The work vehicle 100 according to another embodiment may not include the position and azimuth direction calculator 125.

The inclination measurer 126 measures an acceleration and angular speed of the swing body 120, and measures a posture (for example, a roll angle, a pitch angle, and a yaw angle) of the swing body 120 based on the measurement result. The inclination measurer 126 is installed, for example, on a lower surface of the swing body 120. The inclination measurer 126 can use, for example, an inertial measurement unit (IMU). The inclination measurer 126 may be an inclinometer that measures an inclination angle regardless of acceleration and angular speed. Further, the work vehicle 100 according to another embodiment may not be provided with the inclination measurer 126.

The hydraulic device 127 includes a hydraulic oil tank, a hydraulic pump, and a flow rate control valve. The hydraulic pump is driven by the power of an engine or an electric motor (not shown) and supplies a hydraulic oil to the boom cylinder 134, the arm cylinder 135, and the bucket cylinder 136 via the flow rate control valve. The flow rate control valve has a rod-shaped spool and adjusts the flow rate of the hydraulic oil supplied to the boom cylinder 134, the arm cylinder 135, and the bucket cylinder 136 depending on a position of a spool. The spool is driven based on a control command received from the control device 128. That is, the amount of hydraulic oil supplied to the boom cylinder 134, the arm cylinder 135, and the bucket cylinder 136 is controlled by the control device 128.

The control device 128 transmits information of the image captured by the front camera 122, the bucket camera 123, and the plurality of peripheral monitoring cameras 124, the swing speed, position, azimuth direction, and inclination angle of the swing body 120, and the inclination angle of the boom 131, the arm 132, and the bucket 133, to the remote operation room 500. Hereinafter, the information acquired by various sensors and cameras included in the work vehicle 100 and transmitted by the control device 128 is also referred to as vehicle body information.

The control device 128 receives an operation signal from the remote operation room 500. The control device 128 drives the work equipment 130, the swing body 120, or the undercarriage 110 based on the received operation signal.

(Remote Operation Room)

The remote operation room 500 includes an operator's seat 510, a first display device 520, a second display device 530, an operation device 540, and a control device 550.

The first display device 520 is disposed in front of the operator's seat 510. The first display device 520 is positioned in front of the operator's eyes when the operator sits in the operator's seat 510. As shown in FIG. 1, the first display device 520 is constituted with a central display 521, a left display 522, a right display 523, an upper display 524, and a lower display 525 that are arranged. The left display 522 is provided on the left side of the central display 521. The right display 523 is provided on the right side of the central display 521. The upper display 524 is provided above the central display 521. The lower display 525 is provided below the central display 521.

In another embodiment, the number of displays constituting the first display device 520 is not limited thereto. For example, the first display device 520 may be constituted with one display. Further, the first display device 520 may be such that an image on a curved surface or a spherical surface is projected with a projector or the like.

The second display device 530 is disposed diagonally in front of the operator's seat 510. The second display device 530 displays vehicle body information (for example, a remaining fuel amount and an engine water temperature) transmitted from the work vehicle 100, a notification of an abnormality in the work vehicle 100, or the like. In another embodiment, the position of the second display device 530 does not have to be diagonally in front of the operator's seat 510 as long as being able to be visually recognized by the operator. Further, the remote operation room 500 according to another embodiment may not include the second display device 530. When the remote operation room 500 does not include the second display device 530, the above-mentioned vehicle body information and notification may be displayed on the first display device 520.

The operation device 540 is disposed in the vicinity of the operator's seat 510. The operation device 540 is positioned within a scope where the operator can operate when the operator sits in the operator's seat 510. The operation device 540 includes, for example, an electric lever and an electric pedal. The operator operates the electric lever and the electric pedal, so that the operation device 540 outputs the operation signals of the boom 131, the arm 132, and the bucket 133, the swing operation signal of the swing body 120, and the travel operation signal of the undercarriage 110.

The control device 550 causes the first display device 520 to display the image and the vehicle body information received from the work vehicle 100. That is, the control device 550 is an example of a display control system. The display control system may be a remote operation room 500 including the control device 550, or may further include the control device 128 and the front camera 122 of the work vehicle 100. Further, the control device 550 transmits the operation signal input to the operation device 540, to the work vehicle 100.

(Control Device of Remote Operation Room)

Figure 4:
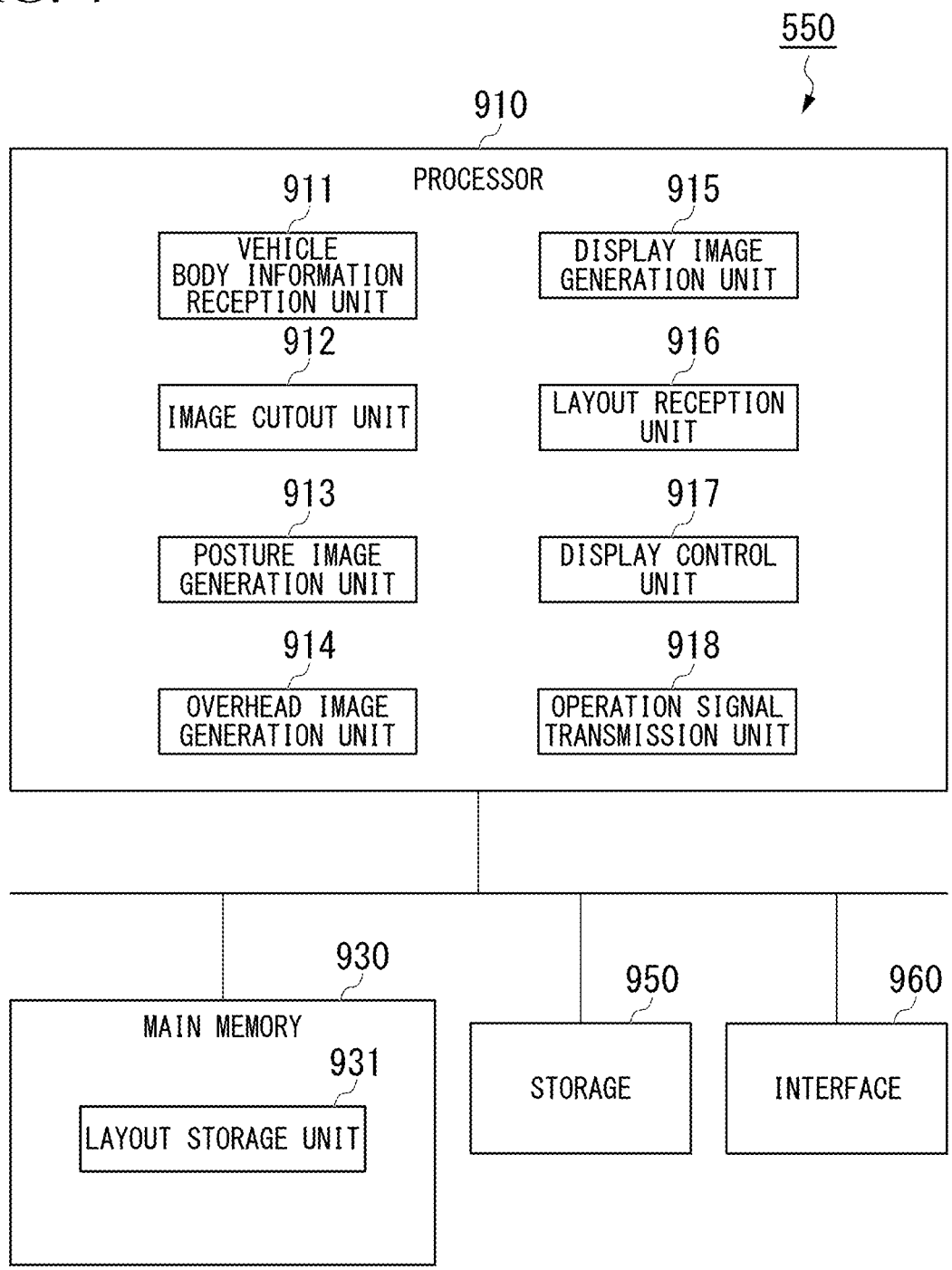
FIG. 4 is a schematic block diagram showing a configuration of a control device of a remote operation room according to the first embodiment.

FIG. 4 is a schematic block diagram showing a configuration of the control device of the remote operation room according to the first embodiment.

The control device 550 is a computer including a processor 910, a main memory 930, a storage 950, and an interface 970. The storage 950 stores a program. The processor 910 reads the program from the storage 950 to develop the program in the main memory 930, and executes processing in accordance with the program.

Examples of the storage 950 include a hard disk drive (HDD), a solid state drive (SSD), a magnetic disk, a magneto-optical disk, Compact Disc Read Only Memory (CD-ROM), Digital Versatile Disc Read Only Memory (DVD-ROM), a semiconductor memory, or the like. The storage 950 may be an internal medium directly connected to a common communication line of the control device 550, or may be an external medium connected to the control device 550 via the interface 970. The storage 950 is a non-transitory tangible storage medium. In another embodiment, the control device 550 may include a custom large scale integrated circuit (LSI) such as a programmable logic device (PLD), or a semi-custom LSI such an application specific integrated circuit (ASIC) in addition to or in place of the above configuration. Examples of the PLD include a programmable array logic (PAL), a generic array logic (GAL), a complex programmable logic device (CPLD), and a field programmable gate array (FPGA). In this case, some or all of the functions realized by the processor 910 may be realized by the integrated circuit.

The processor 910 includes a vehicle body information reception unit 911, an image cutout unit 912, a posture image generation unit 913, an overhead image generation unit 914, a display image generation unit 915, a layout reception unit 916, a display control unit 917, and an operation signal transmission unit 918, by executing a program. Further, the processor 910 secures a storage area of a layout storage unit 931 in the main memory 930 by executing the program.

The vehicle body information reception unit 911, for example, receives the information of the images captured by the front camera 122, the bucket camera 123, and the plurality of peripheral monitoring cameras 124, the swing speed, position, azimuth direction, and inclination angle of the swing body 120, and the inclination angle of the boom 131, the arm 132, and the bucket 133, from the work vehicle 100. That is, the vehicle body information reception unit 911 is an example of a captured image acquisition unit. The image captured by the bucket camera 123 is hereinafter referred to as a bucket internal image P4.

The bucket internal image P4 is an example of a supplementary image for supplementing a lack of sensation obtained while riding in the work vehicle 100. That is, the vehicle body information reception unit 911 is an example of a supplementary image acquisition unit. The operator can sense a slight change in the inclination of the work vehicle 100 by actually riding in the work vehicle 100. When the work vehicle 100 is operated and the bucket 133 contains earth, the work vehicle 100 inclines forward due to the weight of the earth. As a result, the operator can guess the amount of earth contained in the bucket 133. On the other hand, in the case of remote operation, the operator cannot sense the change in the inclination of the work vehicle 100. However, the operator can guess the amount of earth contained in the bucket 133 by visually recognizing the bucket internal image P4. That is, the bucket internal image P4 can supplement the lack of a slight change in the inclination of the work vehicle 100.

Figure 5:
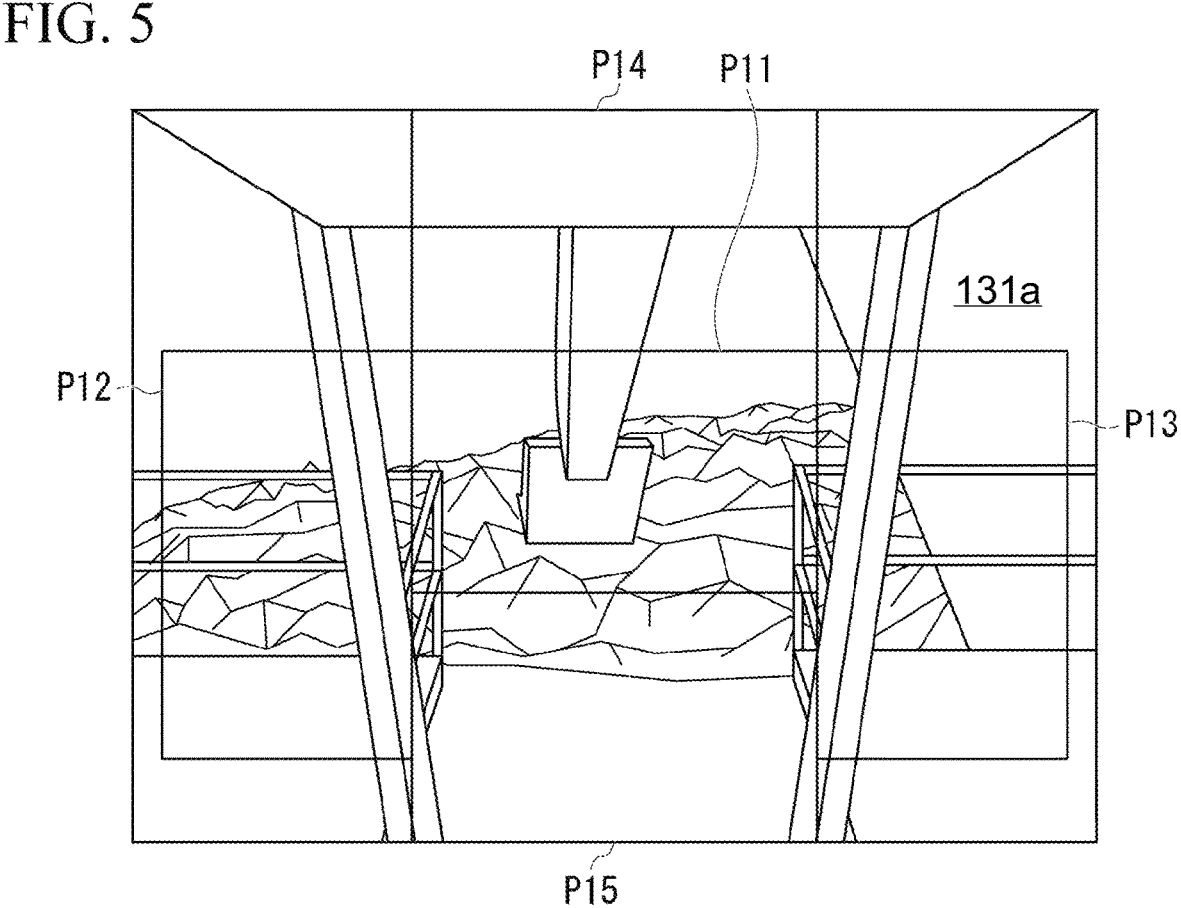
FIG. 5 is a diagram showing an example of an image cut out from an image captured by a front camera.

FIG. 5 is a diagram showing an example of an image cut out from the image P1 captured by the front camera.

The image cutout unit 912 cuts out each of a central image P11 for displaying on the central display 521, a left image P12 for displaying on the left display 522, a right image P13 for displaying on the right display 523, an upper image P14 for displaying on the upper display 524, and a lower image P15 for displaying on the lower display 525, from the image P1 received by the vehicle body information reception unit 911 and captured by the front camera 122. The central image P11 corresponds to the area of the image P1 in which the scenery in front of the cab is shown. The left image P12 corresponds to the area of the image P1 in which the left scenery of the cab is shown. The right image P13 corresponds to the area of the image P1 in which the right scenery of the cab is shown. That is, the lateral scenery of the cab is shown in the left image P12 and the right image P13. The upper image P14 corresponds to the area of the image P1 in which the upper scenery of the cab is shown. The lower image P15 corresponds to the area of the image P1 in which the lower scenery of the cab is shown. As shown in FIG. 5, a lateral side surface 131a portion on the base end side of the boom 131 is shown in a large part of the right image P13. That is, the base end portion of the work equipment 130 is shown in a large part of the right image P13. Hereinafter, the area in which a portion of the work vehicle 100 is shown in the image is also referred to as "an area in which a portion of the work vehicle 100 can be shown". That is, the "area in which a portion of the work vehicle 100 can be shown" is not limited to the area in which a portion of the work vehicle 100 is always shown regardless of the posture of the work vehicle 100. The "area in which a portion of the work vehicle 100 can be shown" may include an area in which a portion of the work vehicle 100 is actually shown in the display image, an area in which a portion of the work vehicle 100 is shown during a majority of the period during work in the display image, an area in which a portion of the work vehicle 100 may be shown in the display image, and a display image in which the work vehicle is shown in a majority of the area in the display images of a plurality of displays, and may correspond to any one thereof. The area in which a portion of the work vehicle 100 may be shown includes an area corresponding to the movable area of the work equipment 130, for example, an area in which a portion of the work vehicle 100 may be shown during the excavation work. When the first display device 520 is constituted with one display, the image cutout unit 912 may not perform cutting-out of the image. The central image P11, the upper image P14, and the lower image P15 are areas of the image P1 in which the bucket 133, which is a work tool, can be shown. On the other hand, the left image P12 and the right image P13 are areas different from the area in which the bucket 133 can be shown. Further, the left image P12 and the right image P13 are areas in which the lateral side surface 131a of the boom 131, which is a support member, can be shown.

Figure 6:
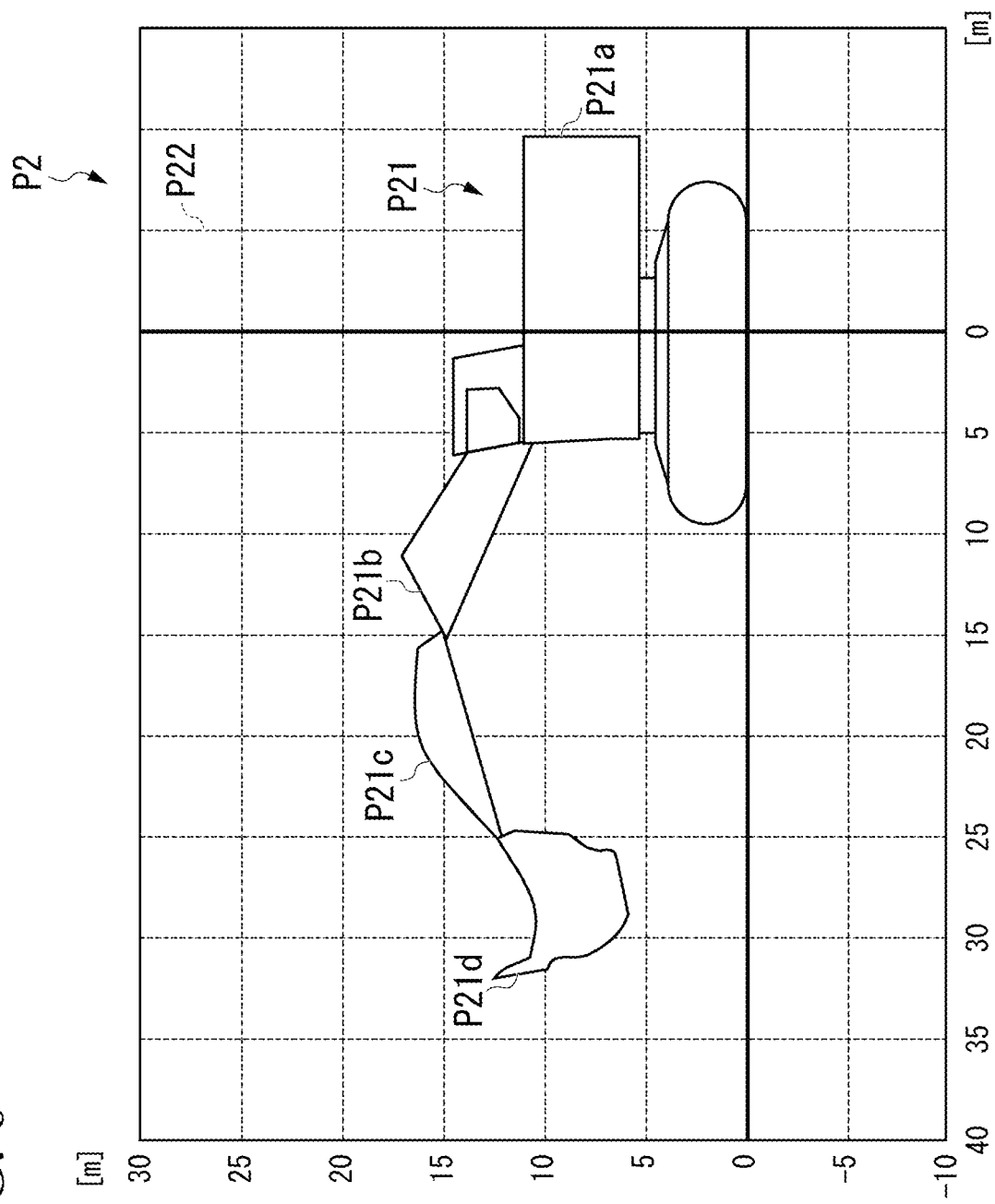
FIG. 6 is a diagram showing an example of a posture image.

FIG. 6 is a diagram showing an example of a posture image of the work vehicle 100.

The posture image generation unit 913 generates a posture image P2 representing the current posture of the work equipment 130 based on the information on the inclination angles of the boom 131, the arm 132, and the bucket 133 received by the vehicle body information reception unit 911. The posture image P2 includes a work vehicle image P21 that depicts the side surface of the work vehicle 100 and a grid P22 that serves as a guideline for the length. In the posture image P2, a swing body image P21a representing the swing body 120 is drawn at a fixed position. The posture image generation unit 913 draws a boom image P21b representing the boom 131 by inclining the boom image P21b only up to the inclination angle of the boom 131 so that the base end portion thereof is positioned at the position of the pin of the swing body image P21a. The posture image generation unit 913 draws an arm image P21c representing the arm 132 by inclining the arm image P21c only up to the inclination angle of the arm 132 so that the base end portion thereof is positioned at the position of the pin of the boom image P21b. The posture image generation unit 913 draws a bucket image P21d representing the bucket 133 by inclining the bucket image P21d only up to the inclination angle of the bucket 133 so that the base end portion thereof is positioned at the position of the pin of the arm image P21c. The swing body image P21a, the boom image P21b, the arm image P21c, and the bucket image P21d may be, for example, stored in the storage 950 in advance. In the posture image P2 according to the first embodiment, the swing body image P21a is drawn at a fixed position, but in another embodiment, the swing body image P21a may be inclined based on the measurement value of the inclination measurer 126.

The posture image P2 is an example of a supplementary image for supplementing a lack of sensation obtained when riding in the work vehicle 100. The posture image generation unit 913 acquires the posture image P2 by generating the posture image P2. That is, the posture image generation unit 913 is an example of the supplementary image acquisition unit. In the specification, "acquiring" means obtaining a new value. For example, "acquiring" includes receiving a value, accepting an input of a value, reading a value from a storage device, calculating another value from one value, and generating a value.

The operator can recognize the depth of the field of view in front of the work vehicle 100 by actually riding in the work vehicle 100. Since the work equipment 130 is shown in the forward field of view of the work vehicle 100, the operator can guess the position and posture of the work equipment 130 by recognizing the depth of the work equipment 130. On the other hand, the depth information is lost in the image captured by the front camera 122. Accordingly, in the case of remote operation, the operator cannot recognize the depth of the work equipment 130. On the other hand, the operator can recognize the position and posture of the work equipment 130 by visually recognizing the posture image P2. That is, the posture image P2 can supplement the lack of depth information. The posture image according to another embodiment may not include the grid P22.

Figure 7:
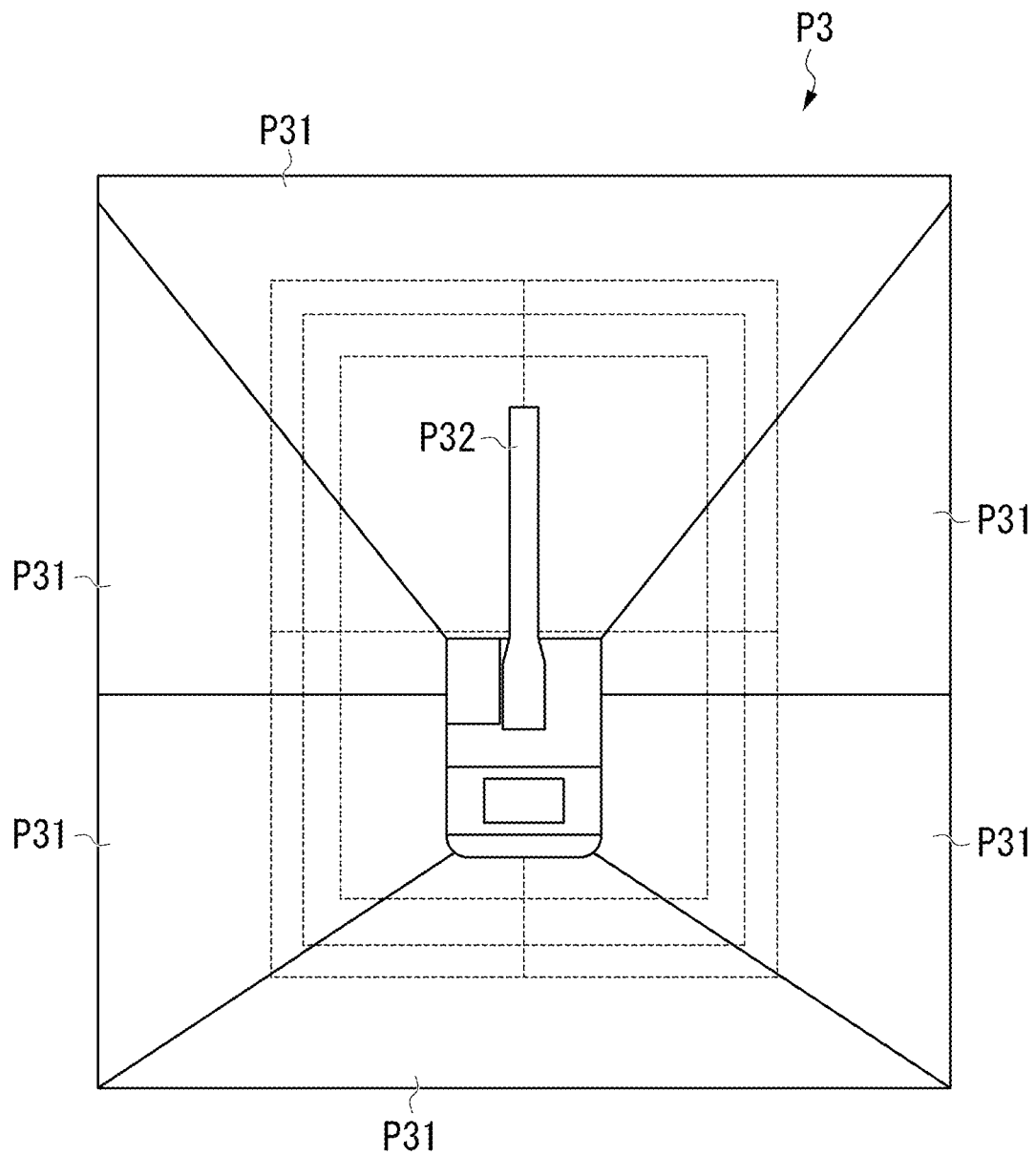
FIG. 7 is a diagram showing an example of a peripheral image.

FIG. 7 is a diagram showing an example of a peripheral image. The overhead image generation unit 914 generates an overhead image P3 shown in FIG. 7 based on the image received by the vehicle body information reception unit 911 and captured by the plurality of peripheral monitoring cameras 124. For example, the overhead image generation unit 914 generates the overhead image P3 based on images captured by peripheral monitoring cameras 124 provided on each of the front portion, left front portion, right front portion, left rear portion, right rear portion, and rear portion of the swing body 120. The overhead image generation unit 914 deforms the image captured by the peripheral monitoring camera 124 based on a predetermined deformation formula based on the disposition of the peripheral monitoring camera 124 to generate a partial overhead image P31, and disposes the partial overhead image P31 at a predetermined position of the overhead image P3. The partial overhead image P31 is a top-view image that constitutes a portion of the overhead image P3. The overhead image generation unit 914 draws the work vehicle image P32 that draws the upper surface of the work vehicle 100 at the center of the overhead image P3.

The overhead image P3 is an example of a supplementary image for supplementing a lack of sensation obtained when riding in the work vehicle 100. That is, the overhead image generation unit 914 is an example of a supplementary image acquisition unit. When actually riding in the work vehicle 100, the operator can recognize the surroundings of the work vehicle 100 from the window or the mirror provided on the side surface of the operator's seat 510. On the other hand, in the case of remote operation, in the image displayed on the first display device 520, the displayed scope does not change although the operator changes the posture. For example, the field of view when the operator looks out of the window cannot be reproduced by the image displayed on the first display device 520. Accordingly, it is difficult for the operator to recognize the surroundings of the work vehicle 100. On the other hand, the operator can recognize the surroundings of the work equipment 130 by visually recognizing the overhead image P3. In another embodiment, instead of the overhead image P3, an image captured by the peripheral monitoring camera 124 or an image captured by a fixed camera may be used as a supplementary image.

Figure 8:
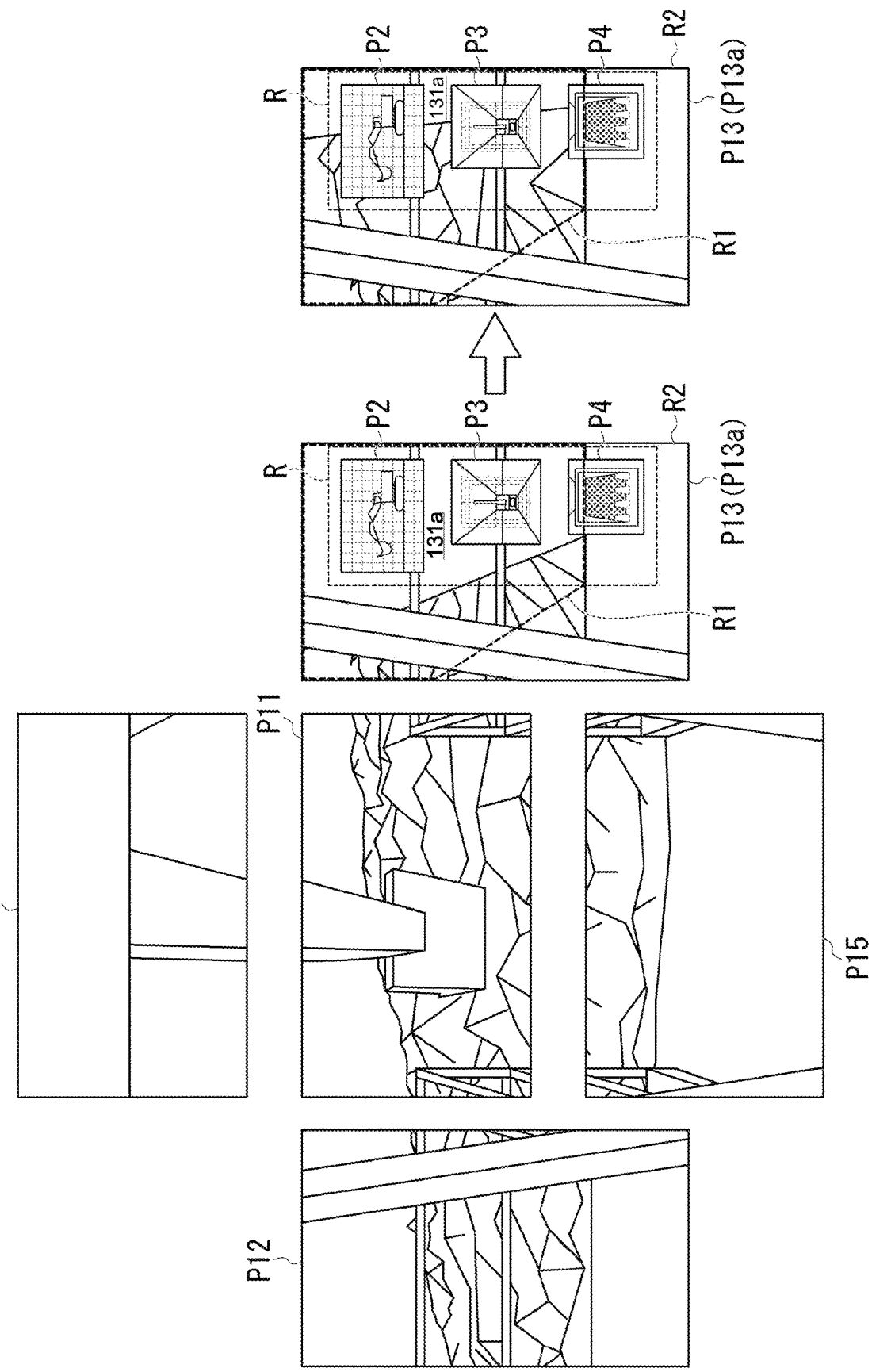
FIG. 8 is a diagram showing an example of a display image displayed on a display device according to the first embodiment.

FIG. 8 is a diagram showing an example of a display image displayed on a display device according to the first embodiment.

The display image generation unit 915 generates a display right image P13a by disposing the posture image P2, the overhead image P3, and the bucket internal image P4 in a disposition area R of a right image P13 cut out by the image cutout unit 912, according to the layout information stored in the layout storage unit 931. The disposition area R is an area in which a portion of the work vehicle 100 including the boom 131 can be shown in the right image P13. In the example shown in FIG. 8, the disposition area R is an area that overlaps an area R1 corresponding to the movable area of the work equipment 130 and an area R2 in which a portion of the swing body 120 is always shown. The layout information is information indicating the layout of a plurality of supplementary images in the disposition area R. For example, the layout information may be information that specifies the disposition order of the plurality of supplementary images, or may be information that specifies the disposition coordinates of each of the plurality of supplementary information.

The layout reception unit 916 accepts an input or a change of layout information by the operation of an operator via a tablet device (not shown) or the like.

The display control unit 917 causes the central display 521 to display the central image P11. The left image P12 is displayed on the left display 522. The control device 550 causes the right display 523 to display the display right image P13a. The control device 550 causes the upper display 524 to display the upper image P14. The control device 550 causes the lower display 525 to display the lower image P15. That is, the display control unit 917 causes the supplementary image to be displayed in the disposition area of the first display device 520 separately from the vehicle body information displayed by the second display device 530.

The operation signal transmission unit 918 generates an operation signal based on the operation of the operation device 540 by the operator and transmits the signal to the work vehicle 100.

(Display Control Method of Remote Operation Room)

Figure 9:
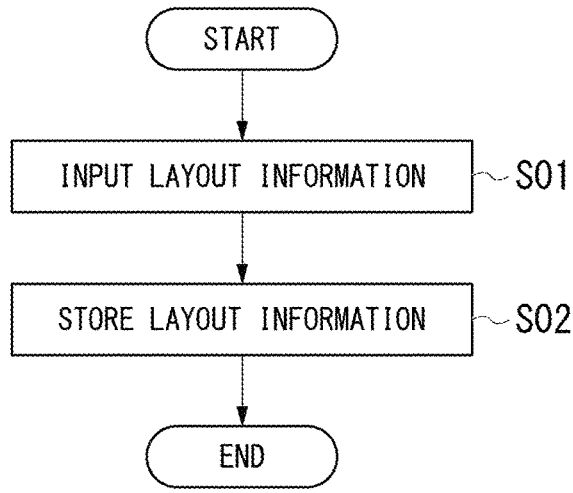
FIG. 9 is a flowchart showing a method of setting layout information by the control device of the remote operation room according to the first embodiment.

FIG. 9 is a flowchart showing a method of setting layout information by the control device of the remote operation room according to the first embodiment.

Before performing the remote operation of the work vehicle 100, the operator operates a tablet terminal or the like (not shown in advance) and inputs the layout of supplementary information in the disposition area R of the right display 523. The layout reception unit 916 of the control device 550 receives the input of the layout information (step S01) and stores the input layout information in the main memory 930 (step S02). In another embodiment, the layout of the supplementary information may be fixed. In this case, the control device 550 may not include the layout reception unit 916, and may not perform the processing of FIG. 9.

Figure 10:
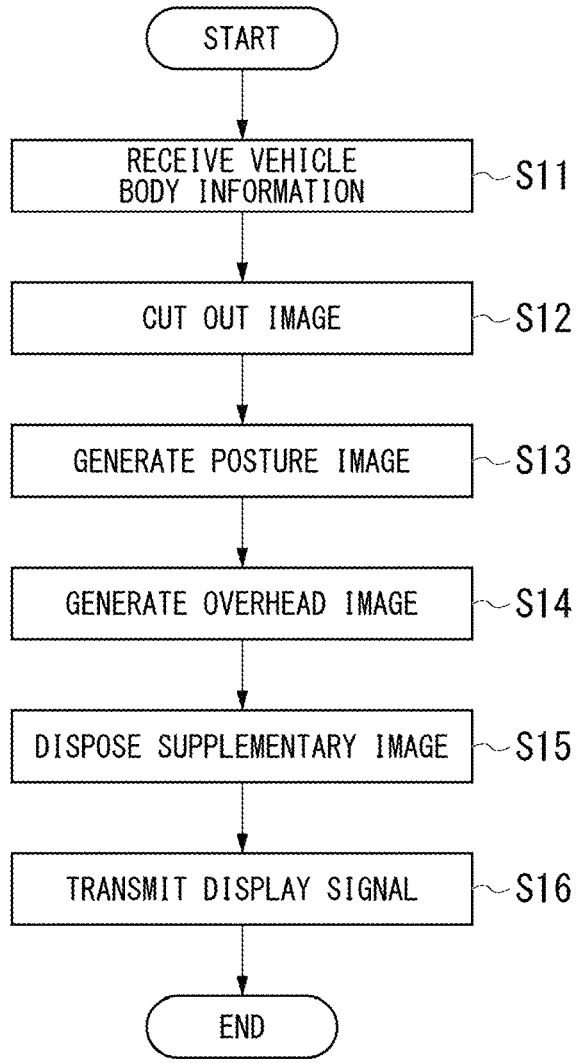
FIG. 10 is a flowchart showing a display control method by the control device of the remote operation room according to the first embodiment.

FIG. 10 is a flowchart showing a display control method by the control device of the remote operation room according to the first embodiment. When the remote operation of the work vehicle 100 is started, the control device 550 executes the display control shown below at a predetermined cycle.

The vehicle body information reception unit 911 receives vehicle body information from the control device 128 of the work vehicle 100 (step S11). Next, the image cutout unit 912 cuts out the central image P11, the left image P12, the right image P13, the upper image P14, and the lower image P15 from the image P1 captured by the front camera 122 in the received vehicle body information (step S12).

The posture image generation unit 913 generates the posture image P2 representing the current posture of the work equipment 130 based on the inclination angles of the boom 131, the arm 132, and the bucket 133 in the received vehicle body information (step S13). The overhead image generation unit 914 generates the overhead image P3 based on the images captured by the plurality of peripheral monitoring cameras 124 in the received vehicle body information (step S14).

The display image generation unit 915 generates the display right image P13a by disposing the posture image P2, the overhead image P3, and the bucket internal image P4 in the disposition area R of the right image P13 according to the layout information stored in the layout storage unit 931 (step S15). The display control unit 917 generates a display signal for displaying the central image P11, the left image P12, the display right image P13a, the upper image P14, and the lower image P15 on the first display device 520, and transmits the signal to the first display device 520 (step S16).

(Operation and Effects)

As described above, the control device 550 of the remote operation room 500 according to the first embodiment causes the first display device 520 to display a display image in which a supplementary image for supplementing a lack of sensation obtained when riding in the work vehicle 100 is disposed, in the area where a portion of the work vehicle 100 can be shown in the captured image by the front camera 122. As a result, the operator can supplement the lack of sensation that the operator cannot obtain because of the remote operation and perform the remote operation of the work vehicle 100. For example, the operator can guess the amount of earth contained in the bucket 133 by visually recognizing the bucket internal image P4 which is a supplementary image, although not feeling the change in the inclination of the work vehicle 100 because of remote operation. Further, the operator can recognize the position and posture of the work equipment 130 by visually recognizing the posture image P2, although the depth of the work equipment 130 cannot be recognized because of remote operation. Further, the operator can recognize the surroundings of the work equipment 130 by visually recognizing the overhead image P3, without changing the posture of the operator to look out of the window. Further, since the disposition image is displayed in the area where a portion of the work vehicle 100 can be shown, the disposition image can be displayed without hiding the work target in the display image. As a result, it is possible to prevent the disposition image from interfering with the operation of the work vehicle 100 by the operator.

In particular, in the first embodiment, the disposition image is disposed in the area where the work equipment 130 can be shown in the display image. When the cab 121 and the work equipment 130 are arranged side by side, the work equipment 130 is shown in the captured image by the front camera 122 and blocks the work target. Accordingly, the control device 550 can secure the wide disposition area R for disposing the supplementary image by setting the area where the work equipment 130 can be shown in the display image as the disposition area R. Another embodiment is not limited thereto, and for example, the area where other portions of the work vehicle 100 can be shown, such as the area where the ceiling of the cab 121 is shown in the upper image P14, may be the disposition area R.

Further, the control device 550 according to the first embodiment receives an instruction for layout of the plurality of supplementary images and arranges the supplementary images side by side according to the instruction. As a result, the operator can display the supplementary information on the first display device 520 in a desired layout. For example, the operator can dispose the supplementary image that is checked at a high frequency at a position at the same height as the line of sight, and dispose the supplementary image that is checked at a low frequency at a position away from the line of sight. Another embodiment is not limited thereto, and the plurality of supplementary images may be disposed based on a fixed layout. In this case, it is preferable that at least one supplementary image is disposed at a position at the same height as the line of sight height of the operator in design.

Another Embodiment

Although one embodiment has been described in detail with reference to the drawings hereinbefore, a specific configuration is not limited to the description above, and various design changes are possible.

For example, in the above-described embodiment, the posture image P2, the overhead image P3, and the bucket internal image P4 are displayed as the supplementary images, but the present invention is not limited thereto. For example, in another embodiment, another supplementary image may be displayed such as an inclinometer showing the inclination of the work vehicle 100 and a teeth indicator showing whether the teeth of the bucket 133 of the work vehicle 100 has come into contact with the work target. The inclinometer is a supplementary image that supplements a lack of sensation of the inclination of the work vehicle 100. The teeth indicator is a supplementary image that supplements a lack of sensation of the impact on the work vehicle 100 when the bucket 133 comes into contact with the work target.

Further, for example, in another embodiment, the number of supplementary images does not have to be three. For example, the number of supplementary images according to another embodiment may be one or two, or four or more. Further, only a portion of the supplementary images may be displayed among the plurality of supplementary images.

Further, in the above-described embodiment, the control device 550 generates a supplementary image based on the vehicle information received from the work vehicle 100, but the present invention is not limited thereto. For example, in another embodiment, the control device 128 of the work vehicle 100 or an external server device may generate a supplementary image, and the control device 550 may receive and display the supplementary image.

Further, in the above-described embodiment, the display control device is mounted on the remote operation system 1, but the present invention is not limited thereto. For example, in another embodiment, the display control device may be applied to a radio control system that operates the work vehicle 100 by wireless communication at a position outside the work vehicle 100 where the work vehicle 100 can be visually recognized. When applying the display control device to the radio control system, the control device may include a display device.

According to the above aspect, the display control system can supplement the sensation that an operator cannot obtain because of remote operation.

The invention claimed is:

1. A display control system that controls a display device provided outside a work vehicle that includes work equipment having a work tool, a boom, and an arm, the boom and the arm supporting the work tool, the display control system comprising:

a control device including a processor and a storage, the control device being programmed to acquire a captured image captured by an imaging device mounted on the work vehicle, the captured image including a lateral side surface on a base end side of the boom;

acquire a supplementary image representing information related to the work vehicle to supplement a lack of sensation by an operator operating the work vehicle remotely without riding in the work vehicle;

generate a display image in which the supplementary image overlaps the captured image in a disposition area of the captured image, the disposition area being an area where the lateral side surface on the base end side of the boom is shown in the captured image; and output a display signal in order to display the display image on the display device the supplementary image including at least one of a posture image and a bucket internal image, the posture image depicting a side surface of the work vehicle and a current posture of the work equipment and the bucket internal image depicting an inside of a bucket of the work tool, the control device being configured to generate the posture image based on inclination angles of the boom and the arm received from a boom angle sensor and an arm angle sensor provided on the work vehicle, and the control device being configured to receive the bucket internal image from a bucket camera provided on the work equipment.

2. The display control system according to claim 1, wherein the control device is further programmed to receive an instruction for layout of a plurality of supplementary images, and arrange the plurality of supplementary images side by side in the disposition area according to the instruction for layout.

3. The display control system according to claim 1, wherein the posture image further depicts a current posture of the work equipment based on an inclination angle of the bucket the work tool received from a bucket angle sensor provided on the work vehicle.

4. The display control system according to claim 1, wherein the posture image includes a swing body image representing a swing body of the work vehicle, the control device being configured to vary an inclination of the swing body image based on a measurement value of an inclination measurer provided on the work vehicle.

5. The display control system according to claim 1, wherein the supplementary image includes an overhead image that is generated based on images captured by a plurality of cameras, the plurality of cameras being provided on a swing body of the work vehicle.

6. The display control system according to claim 1, wherein the supplementary image includes the posture image and the bucket internal image.

7. A display control method for a display device of a remote operation room for remotely operating a work vehicle that includes work equipment having a work tool, a boom, and an arm, the boom and the arm supporting the work tool, the display control method comprising:

acquiring a captured image captured by an imaging device mounted on the work vehicle, the captured image including a lateral side surface on a base end side of the boom;

acquiring a supplementary image representing information related to the work vehicle to supplement a lack of sensation by an operator operating the work vehicle remotely without riding in the work vehicle;

generating a display image in which the supplementary image overlaps the captured image in a disposition area of the captured image, the disposition area being an area where the lateral side surface on the base end side of the boom is shown in the captured image; and displaying the display image on the display device the supplementary image being generated to include at least one of a posture image and a bucket internal image, the posture image depicting a side surface of the work vehicle and a current posture of the work equipment and the bucket internal image depicting an inside of a bucket of the work tool, the posture image being generated based on inclination angles of the boom and the arm received from a boom angle sensor and an arm angle sensor provided on the work vehicle, and the bucket internal image being received from a bucket camera provided on the work equipment.

8. The display control method according to claim 7, wherein the supplementary image is generated to include the posture image and the bucket internal image.

* * * * *